US012623488B2

(12) United States Patent
Gavin et al.

(10) Patent No.: US 12,623,488 B2
(45) Date of Patent: May 12, 2026

(54) AXLE SEAL SHIELD FOR COMPACTION MACHINE

(71) Applicant: Caterpillar Inc., Peoria, IL (US)

(72) Inventors: Gerald William Gavin, Big Rock, IL (US); James William Schaffer, Oswego, IL (US); Matthew M. DeSanto, Maple Park, IL (US); Jeremy Dean Folkerts, Naperville, IL (US); Travis Edward Schwark, Shorewood, IL (US)

(73) Assignee: Caterpillar Inc., Peoria, IL (US)

( * ) Notice: Subject to any disclaimer, the term of this patent is extended or adjusted under 35 U.S.C. 154(b) by 1051 days.

(21) Appl. No.: 17/730,662

(22) Filed: Apr. 27, 2022

(65) Prior Publication Data

US 2023/0347687 A1 Nov. 2, 2023

(51) Int. Cl.
| *B60B 27/00* | (2006.01) |
| *E02D 3/02* | (2006.01) |
| *E02D 3/026* | (2006.01) |

(52) U.S. Cl.
CPC ........ B60B 27/0073 (2013.01); E02D 3/0265 (2013.01); B60B 27/001 (2013.01); B60Y 2200/41 (2013.01)

(58) Field of Classification Search
CPC . B60B 27/0073; B60B 27/001; E02D 3/0265; E02D 3/02; E02D 3/026
See application file for complete search history.

(56) References Cited

U.S. PATENT DOCUMENTS

| 3,913,985 A | 10/1975 | Orr et al. | |
| 5,820,230 A | * | 10/1998 | Freeman | ............. B62D 55/088 |
| | | | | 305/110 |
| 5,951,123 A | * | 9/1999 | Bomstad | ................ E02D 3/026 |
| | | | | 172/112 |
| 5,967,242 A | * | 10/1999 | Caron | ...................... B09B 1/00 |
| | | | | 404/124 |
| 6,213,471 B1 | 4/2001 | Anderson et al. | |
| 6,322,170 B1 | 11/2001 | Knell et al. | |
| 7,556,323 B1 | 7/2009 | Gachhadar et al. | |
| 7,731,307 B1 | * | 6/2010 | Freeman | ................... B60B 7/00 |
| | | | | 172/508 |
| 7,946,661 B1 | 5/2011 | Freeman | |
| 7,997,659 B2 | 8/2011 | Oertley et al. | |
| 8,720,904 B2 | 5/2014 | Rossi | |
| 9,156,310 B2 | 10/2015 | Morman et al. | |
| 9,279,500 B2 | 3/2016 | Bishop | |
| 9,421,823 B2 | 8/2016 | Barbir | |

(Continued)

FOREIGN PATENT DOCUMENTS

| EP | 2299129 A1 | 3/2011 |
| JP | 6385904 B2 | 9/2018 |

*Primary Examiner* — Abigail A Risic

(57) ABSTRACT

A shield assembly is configured for use with the axle assembly of a compaction machine. The machine includes a ground-engaging device with a hub that defines a cavity and an inboard opening. The axle assembly comprises a spindle and a final drive, with a gap between them. The shield assembly includes a shield body mounted within the hub cavity, positioned above the spindle and final drive, and extending over the gap. This arrangement directs debris away from the gap and associated seals, reducing contamination and wear of axle components during operation in debris-laden environments.

17 Claims, 6 Drawing Sheets

(56) References Cited

U.S. PATENT DOCUMENTS

| | | | |
|---|---|---|---|
| 9,656,707 | B2 | 5/2017 | Johannsen |
| 10,343,733 | B2 | 7/2019 | Iijima et al. |
| 10,370,047 | B2 | 8/2019 | Hirota et al. |
| 10,442,480 | B2 | 10/2019 | Haas et al. |
| 10,682,884 | B1 * | 6/2020 | Pierce ................. F16H 57/0452 |
| 10,694,653 | B2 | 6/2020 | Base et al. |
| 11,208,163 | B2 | 12/2021 | Freeman |
| 2012/0067603 | A1 * | 3/2012 | Springer ................. E02D 3/039 |
| | | | 172/508 |
| 2015/0192207 | A1 | 7/2015 | Stoakes |
| 2017/0190367 | A1 | 7/2017 | Thorson et al. |
| 2020/0115873 | A1 * | 4/2020 | Pierce ....................... B60B 7/04 |
| 2021/0276637 | A1 | 9/2021 | Suanno |
| 2021/0291918 | A1 | 9/2021 | Suanno |
| 2024/0308271 | A1 * | 9/2024 | Kafle ....................... B60B 35/16 |

* cited by examiner

AXLE SEAL SHIELD FOR COMPACTION MACHINE

TECHNICAL FIELD

The present disclosure relates to compaction machines and, more particularly, to shield assemblies for axles on compaction machines used to protect the axle and associated components from damage caused by debris.

BACKGROUND

Compaction machines, such as landfill compactors, typically traverse terrain that is covered with debris and refuse. For example, landfill compactors drive over trash, thereby to compact or compress it for depositing in a landfill site. During such operation, the landfill compactor may encounter a significant amount of loose debris, which may migrate along the axle in the direction of the wheel into the internal cavity of the wheel which houses a rotational seal between the interface of the wheel and the axle. When this happens, the integrity of the seal can be compromised, thereby creating the need for immediate repair. The machine must be taken out of service to make the repair, which may include the replacement of several components. If operation of the machine continues without making the repair, one or more components of the drive assembly can be destroyed or negatively affected.

U.S. Pat. No. 7,731,307 is entitled, "Seal Guard for Compactor." The '307 patent is directed to a guard for the axle seal of a wheeled tractor, which is an annular steel structure that bridges the plane of the seal between a spindle and final drive. The guard includes a pair of axially spaced flanges having circular outer peripheries, at least one of the outer peripheries of the flanges being sized to produce a narrow gap seal with a circular interior surface of a wheel rim, and a hub extending axially between the flanges and spaced radially inward of said flange outer peripheries. The flanges, hub and interior wheel surface define an annular space adapted to trap debris.

SUMMARY OF THE DISCLOSURE

In one aspect of the present disclosure, a machine comprises a frame, a ground engaging device including a hub, the hub defining a cavity and an inboard opening to the cavity, and an axle assembly connected to the frame and supporting the ground engaging device. The axle assembly extends along an axle axis and comprises a housing coupled to the frame, a spindle coupled to the housing, a final drive rotatably coupled to the spindle and disposed within the cavity of the ground engaging device, and a gap disposed between the spindle and the final drive. A shield assembly is coupled to the axle assembly and disposed within the cavity of the ground engaging device. The shield assembly is located above portions of the spindle and the final drive, wherein the shield assembly includes a shield body extending over the gap.

In another aspect of the disclosure, a shield assembly is provided for an axle assembly of a machine. The machine includes a ground engaging device including a hub, the hub defining a cavity and an inboard opening to the cavity. The axle assembly includes a spindle, a final drive rotatably coupled to the spindle, and a gap disposed between the spindle and the final drive. The shield assembly comprises a shield body coupled to the axle assembly and disposed within the cavity of the ground engaging device, the shield body being located above portions of the spindle and the final drive, wherein the shield body extends over the gap.

In yet another aspect of the disclosure, a final drive assembly for a machine, comprises a ground engaging device including a hub defining a cavity, and an inboard opening to the cavity. An axle assembly comprises a housing, a spindle coupled to the housing, a final drive rotatably coupled to the spindle and disposed within the cavity of the ground engaging device, wherein the housing, spindle, and final drive are disposed along an axle axis, and a gap disposed between the spindle and the final drive, the gap being concentric with the axle axis and disposed along a virtual gap plane extending perpendicular to the axle axis. A shield assembly is coupled to the axle assembly and disposed within the cavity of the ground engaging device. The shield assembly comprises a shield body located above portions of the spindle and the final drive, the shield body comprising a shield body first end coupled to a top portion of the spindle inboard of the virtual gap plane a shield body second end disposed outboard of the virtual gap plane, and a shield body length extending parallel to the axle axis and across the virtual gap plane from the shield body first end to the shield body second end.

DETAILED DESCRIPTION

The present disclosure provides a shield assembly for an axle assembly provided on any mobile machine having an axle and a final ground-engaging device, e.g., wheels, tracks, etc. Examples of such machines include machines used for compaction, mining, construction, farming, transportation, or any other industry known in the art. Moreover, one or more implements may be connected to the machine for a variety of tasks, including, for example, compacting, moving, loading, lifting, brushing, and include, for example, blades, buckets, compactors, forked lifting devices, brushes, grapples, cutters, shears, blades, breakers/hammers, augers, and others. For example, in some embodiments, a shield assembly is provided that prevents ingress of debris to a sealed interface, such as a DUO-CONE® seal, provided with the axle assembly.

Figure 1:
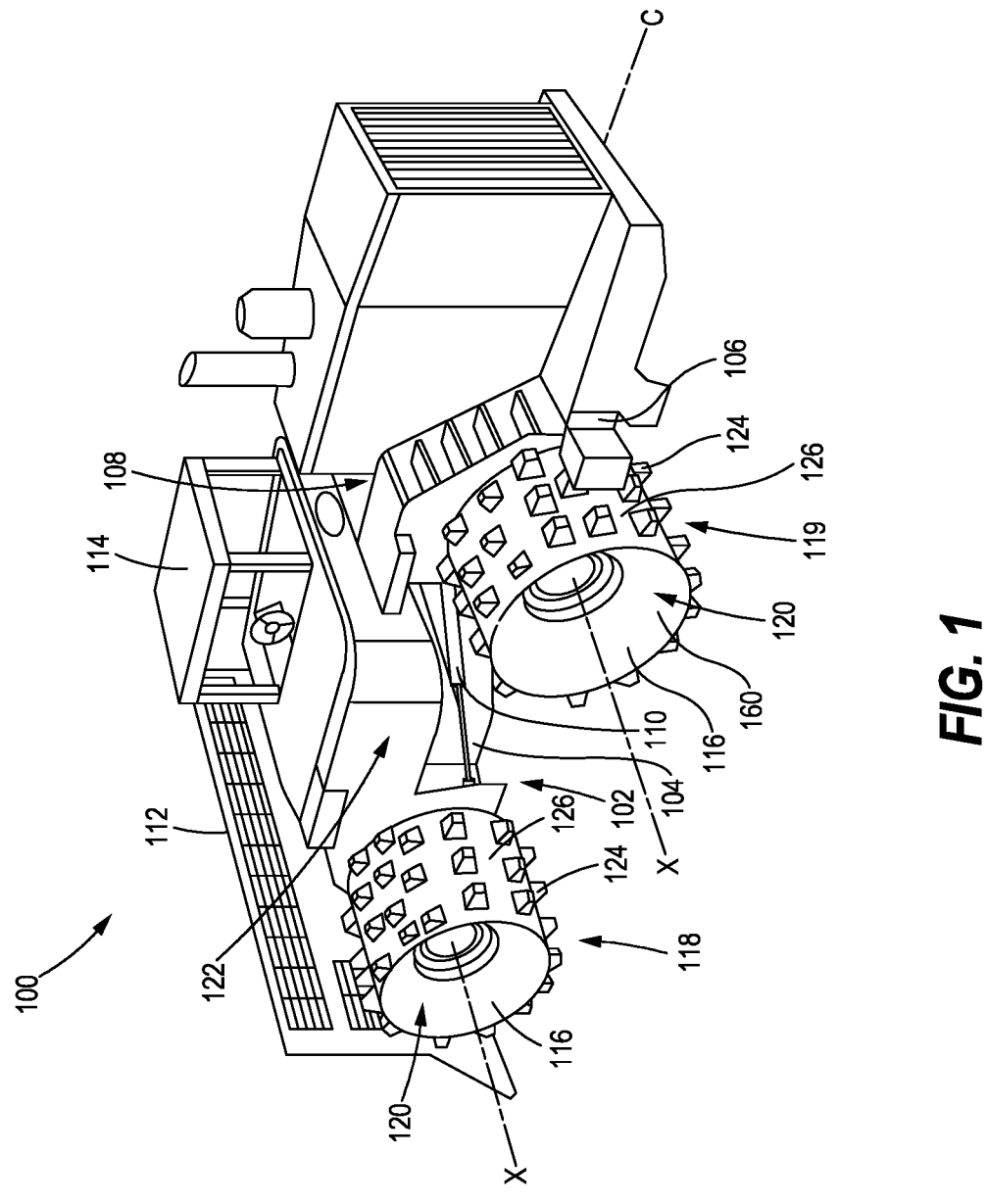
FIG. 1 is a perspective view of an embodiment of a landfill compaction machine having a shield assembly according to the present disclosure.

An exemplary embodiment of a machine 100 in the form of a landfill compactor is illustrated in FIG. 1. Referring to FIG. 1, the landfill compactor machine 100 includes a frame 102 including a forward portion or non-engine end 104 and a rearward portion or engine end 106. The engine end 106 and the non-engine end 104 of the frame 102 are connected to each other at a hitch or articulation joint 108. A pair of steering cylinders 110 (one shown) may be mounted between the non-engine end 104 and the engine end 106 of the frame 102 to provide steering.

A blade 112 is connected to the forward portion or non-engine end 104 of the frame 102. While FIG. 1 shows the non-engine end 104 of the frame 102 supporting an operator station or cab 114, alternatively the engine end 106 of the frame 102 may support the cab 114. The engine end 106 of the frame 102 can support, for example, a power source and cooling system components (not shown), the power source being operatively connected through a drive train (not shown) to drive at least one ground engaging device (such as, a plurality of wheels 116, as shown) for movement of the machine 100.

The frame 102 supports a front axle assembly 118 and a rear axle assembly 119. Other than their relative positions on the machine 100, the front axle assembly 118 and the rear axle assembly 119 are similar in construction. Each axle assembly 118, 119 is positioned in transverse relation to a centerline "C" of the machine and extends laterally from opposite sides of the frame 102.

Each axle assembly 118, 119 is connected to the frame 102 using any suitable technique. In some embodiments, the axle can be connected to the frame by being fixedly mounted to the frame, and in other embodiments the axle can be connected to the frame by being pivotally mounted to the frame to "oscillate" with respect thereto in response to changes to the terrain.

The front axle assembly 118 and the rear axle assembly 119 each has a pair of outboard ends 120 extending from both sides of the machine 100. The outboard ends on a right side of the machine (not shown) are similar in construction to the outboard ends 120 on a left side 122 of the machine (shown in FIG. 1).

Each outboard end 120 supports a ground engaging device in the form of a wheel 116 such that the machine 100 has four wheels 116. Each wheel 116 is mounted to its respective axle assembly 118, 119 for rotation with respect thereto about an axle axis "X" which is generally perpendicular to the centerline "C" of the machine 100.

In the illustrated embodiment, each wheel 116 includes a plurality of teeth 124 positioned on an outer surface 126 of the wheel 116. The teeth 124 of a particular wheel 116 are in predetermined, spaced relationship to each other in a specific pattern across the outer surface 126 of the wheel 116 in a well-known manner to provide sufficient compacting force to the ground or debris beneath each wheel.

Figure 2:
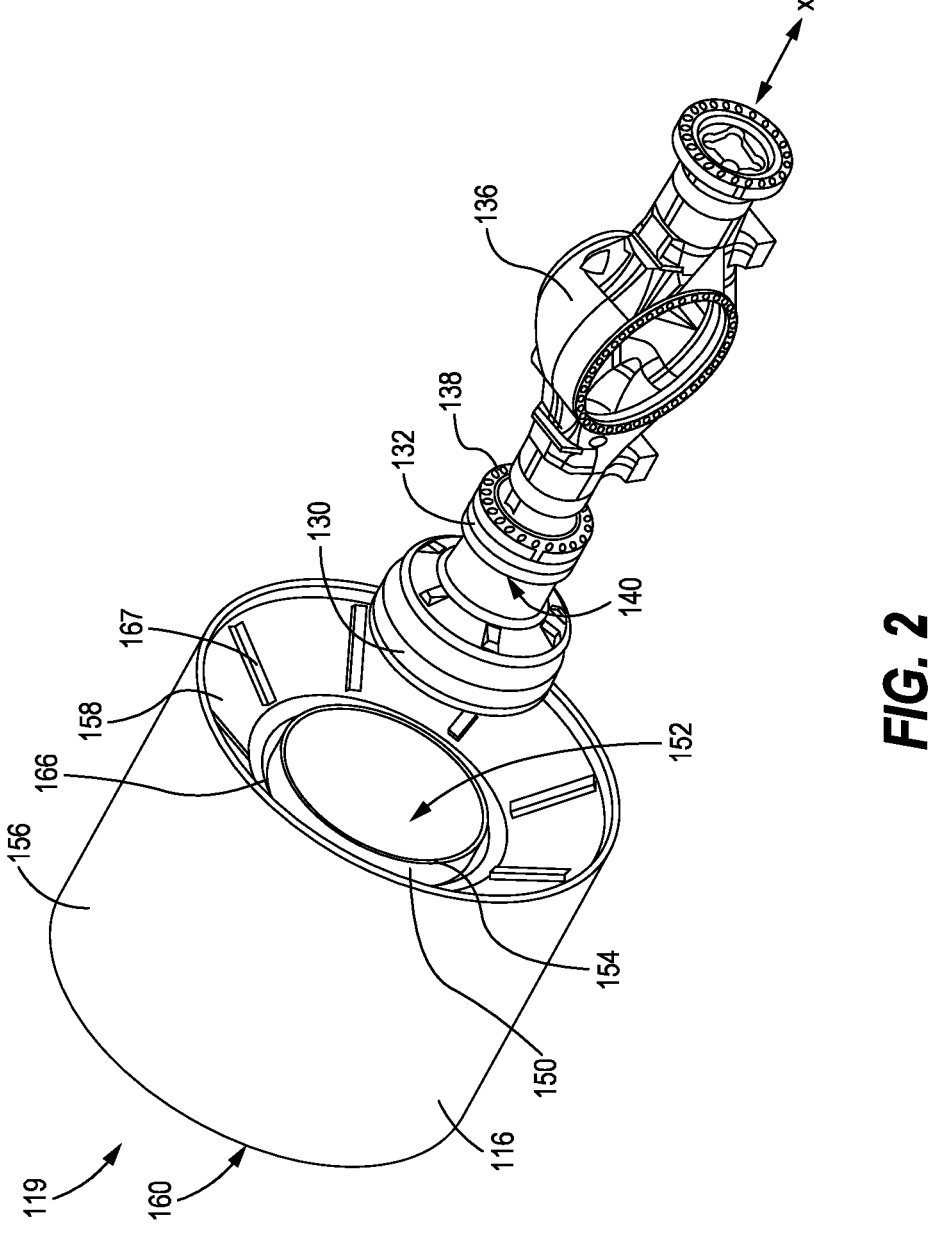
FIG. 2 is an exploded view of a portion of an axle assembly for the landfill compaction machine of FIG. 1.

Referring to FIG. 2, a portion of the rear axle assembly 119 is shown. It should be understood that the description of the rear axle assembly 119 is also applicable to the front axle assembly 118. The rear axle assembly includes a wheel 116 (shown in this view without teeth), a distal drive or final drive 130, a spindle 132, and a housing 136, as well as a spindle, a final drive, and a wheel for the right side of the machine (not shown). It should be understood that the description of the components of the rear axle assembly 119 for the left side of the machine is applicable to the corresponding components of the rear axle assembly 119 for the right side of the machine.

On each side of the rear axle assembly 119, the spindle 132 is fixedly connected to the housing 136 via a plurality of bolts 138. To allow for the rotation of the wheel, the distal drive 130 is rotatably movable with respect to the spindle

132 which is in fixed relationship to the housing 136. The drive train of the machine can be adapted to be in driving relationship with each final drive 130 of the axles of the machine to provide an all-wheel drive machine. Components of the drive train can be housed within the housing 136, the spindle 132, and the final drive 130.

In the illustrated embodiment, the relative rotation between the final drive 130 and the spindle 132 is accommodated by an annular gap 140 therebetween. A seal 141 (FIG. 6), such as a DUO-CONE® seal group assembly of well-known construction and commercially available from Caterpillar Inc. of Peoria, Ill., may be located within the annular gap 140 to prevent dirt from entering the axle assembly 119 and retain lubricant within the housing 136, the spindle 132, and the final drive 130. Other seal arrangements are well known to those of skill in the art and can be used in other embodiments. Each wheel 116 of the machine 100 is removably mounted to a respective final drive 130 at both ends of each axle assembly 118, 119 in known fashion.

Referring to FIG. 2, the wheel 116 includes a centrally-disposed cylindrical hub 150, which defines a cavity 152 and an inboard opening 154 to the cavity 152, and a cylindrical drum 156 that is positioned substantially concentrically with respect to the hub 150 and the axle axis "X" of the axle assembly 119 such that the hub 150 is disposed within the drum 156. In the illustrated embodiment, the drum 156 is substantially wider (along the axle axis "X") than the hub 150.

Each wheel 116 includes an inner side plate 158 and an outer side plate 160 (see FIGS. 2 and 3) extending between the hub 150 and the drum 156. The drum 156 is connected to the hub 150 by the inner side plate 158 and the outer side plate 160. The inner side plate 158 is substantially frusto-conical and includes a central edge 166 adjacent to the hub 150. The inner side plate 158 is tapered outwardly from the drum 156 to the hub 150. The outer side plate 160 is tapered inwardly from the drum 156 to the hub 150 (see FIGS. 2 and 3). In other embodiments, the inner side plate and the outer side plate can be substantially planar. The inner side plate 158 includes a plurality of wear strips 167 that are in radial, spaced relationship to each other about the axle axis "X" of the axle assembly 119.

Referring to FIGS. 3-6, a shield assembly 200 is provided to direct debris around the annular gap 140 associated with the final drive 130 of each of the four wheels 116. The shield assembly 200 is preferably made from steel plate or steel castings and is generally positioned above the axle assembly 119 to guide debris away from the annular gap 140. In the illustrated examples, the shield assembly 200 is coupled to the axle assembly 119 and disposed within the cavity 152 of the ground engaging device (e.g., the wheel 116). The shield assembly 200 is located above portions of both the spindle 132 and the final drive 130, and includes a shield body 202 extending over the annular gap 140. The positioning of the shield assembly 200 relative to the axle assembly 119 advantageously directs debris away from the annular gap 140. In some examples, the shield body 202 is imperforate to prevent debris from passing through the shield body 202 to reach the annular gap 140.

Figure 3:
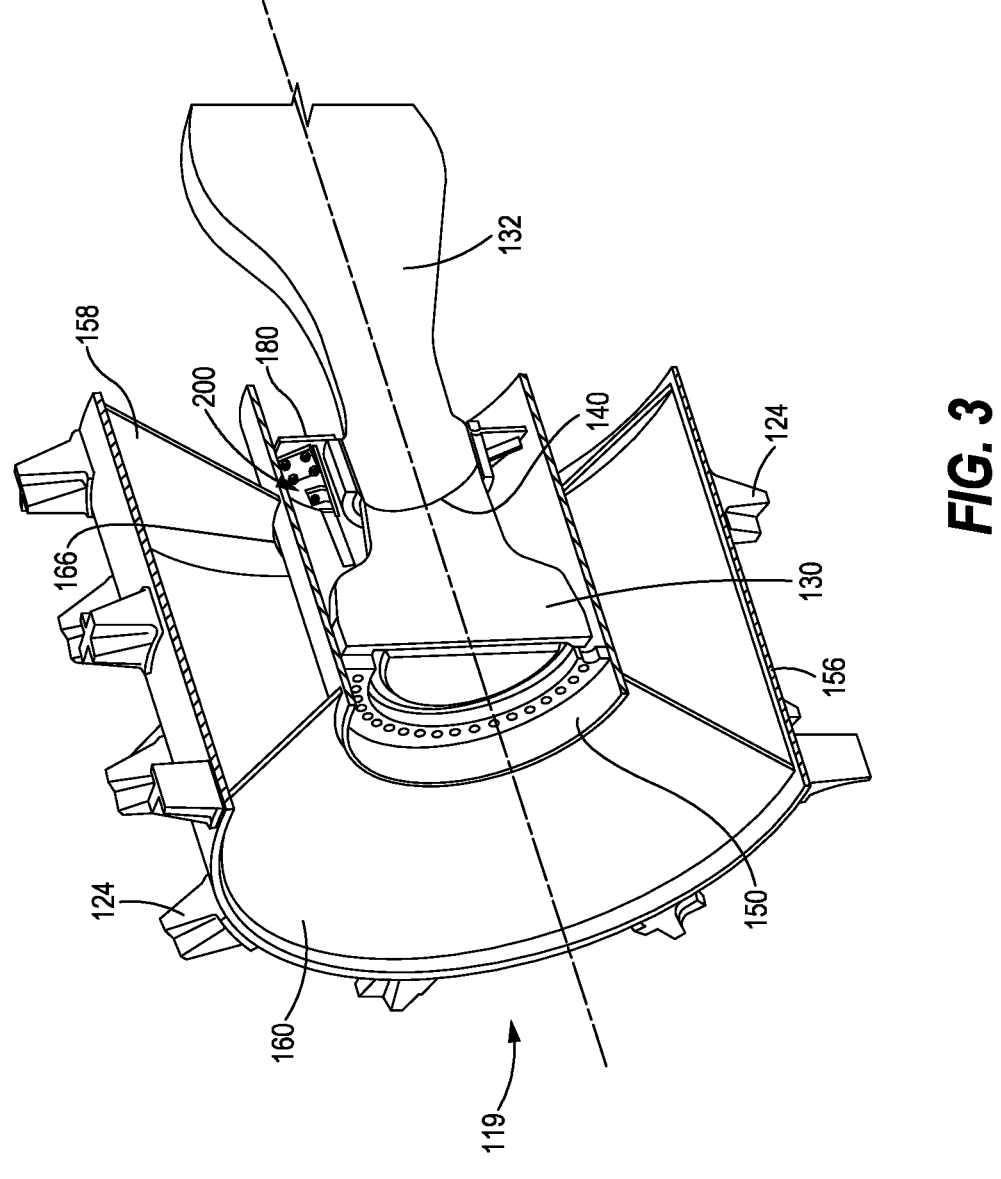
FIG. 3 is a perspective view, in cross-section, of the axle assembly of FIG. 2 showing the shield assembly according to the present disclosure.
Figure 4:
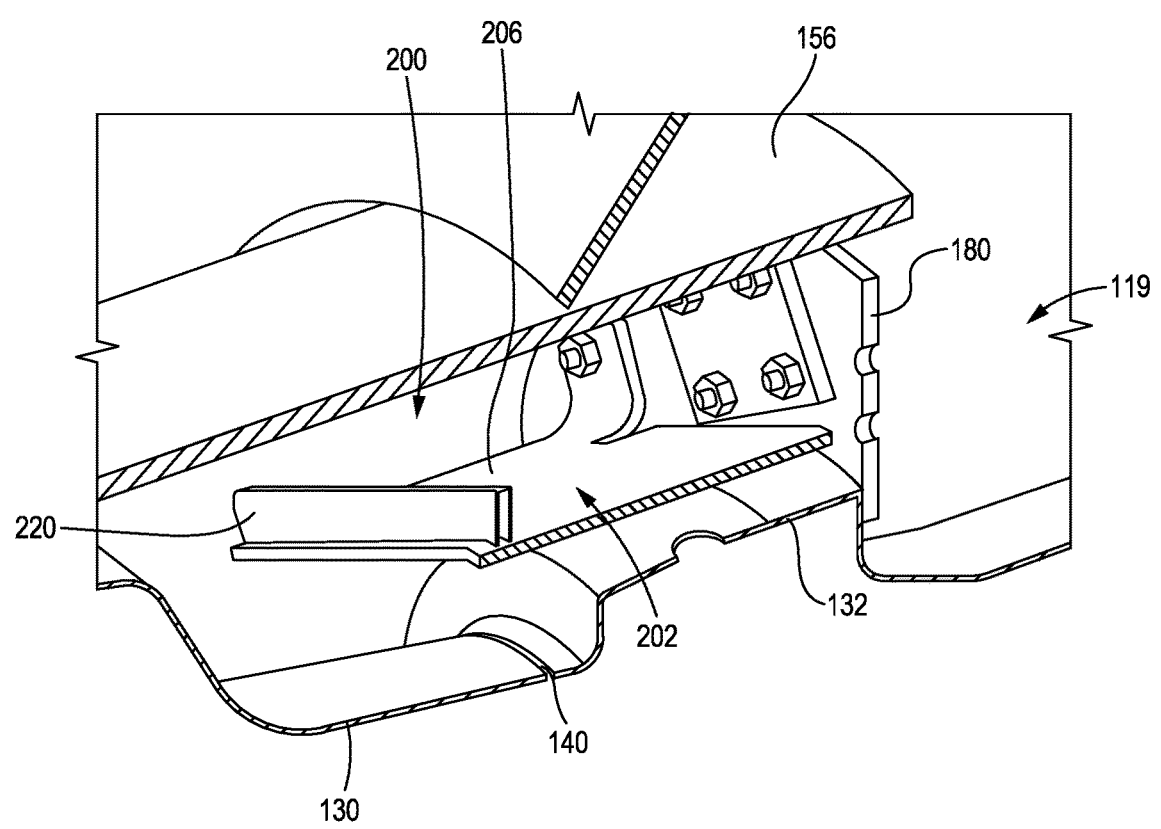
FIG. 4 is an enlarged perspective view, in cross-section, of the axle assembly of FIG. 3 showing the shield assembly according to the present disclosure.
Figure 5:
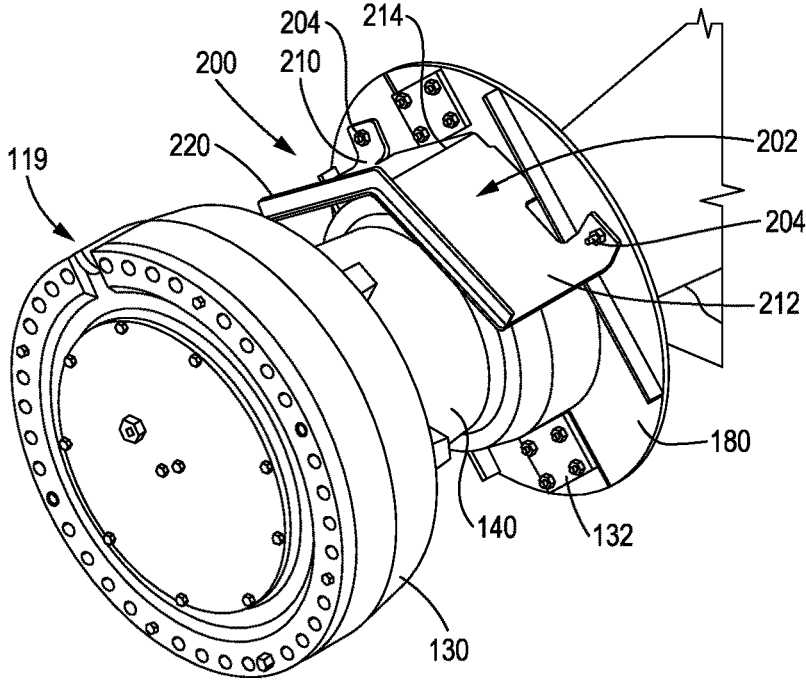
FIG. 5 is a perspective view of the axle assembly of FIG. 3 showing the shield assembly according to the present disclosure.
Figure 6:
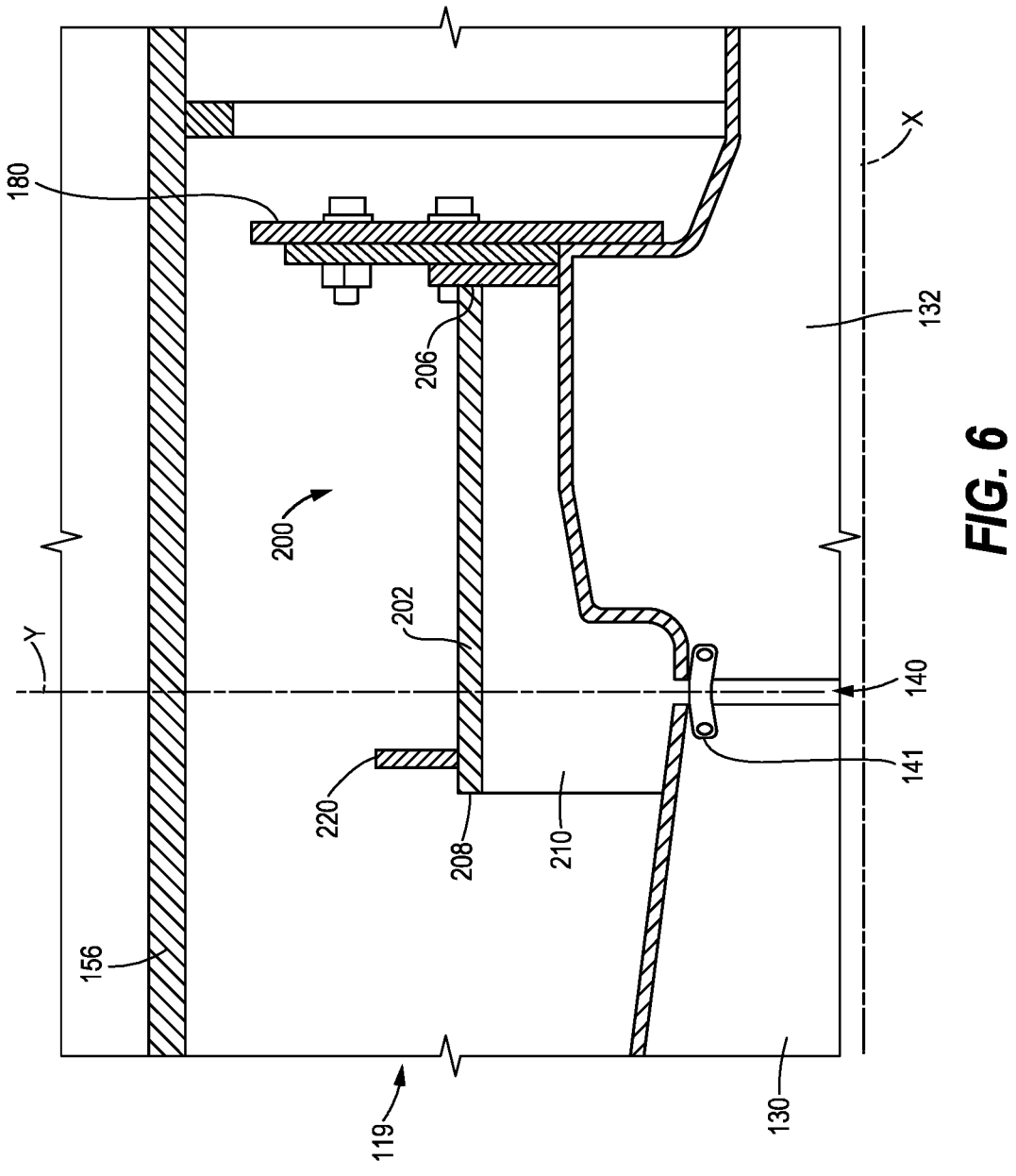
FIG. 6 is a side elevation view, in partial cross-section, of the axle assembly of FIG. 3 showing the shield assembly according to the present disclosure.

A particular configuration for coupling the shield assembly 200 to the axle assembly 119 is best shown in FIGS. 4-6. In the illustrated example, the axle assembly 119 includes a spindle wall 180 that is coupled to and extends outwardly from the spindle 132. When the axle assembly 119 is coupled to the wheel 116, the spindle wall 180 is disposed within the cavity 152 of the wheel 116, as best shown in FIGS. 3, 4, and 6. The shield assembly 200 is coupled to the spindle wall 180, such as by bolts 204 (FIG. 5).

FIG. 6 more precisely illustrates the location of the shield assembly 200 relative to the axle assembly 119. In this example, the annular gap 140 is concentric with the axle axis "X" and is disposed along a virtual gap plane "Y" extending perpendicular to the axle axis "X." The shield body 202 includes a shield body first end 206, coupled to a top portion of the spindle 132 inboard of the virtual gap plane "Y," and a shield body second end 208 disposed outboard of the virtual gap plane "Y." The shield body 202 further has a shield body length extending parallel to the axle axis "X" and across the virtual gap plane "Y" from the shield body first end 206 to the shield body second end 208.

In some examples, the shield assembly 200 is configured to better guide debris around the axle assembly 119. As best illustrated in FIGS. 4 and 5, the shield assembly 200 may include a first planar lateral portion 210 joined to a second planar lateral portion 212 by a peaked central portion 214. By configuring the shield assembly 200 to have a peaked roof shape, debris present in the cavity 152 is better directed around the axle assembly 119. Still further, the shield assembly 200 may include a flange 220 coupled to the shield body 202 adjacent the shield body second end 208, to further guide debris around the axle assembly 119.

Figure 7:
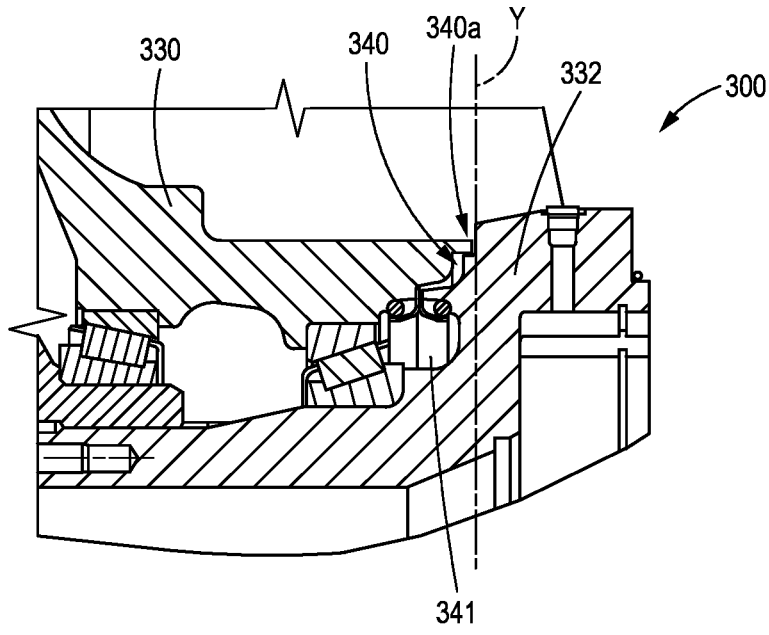
FIG. 7 is a side elevation view, in partial cross-section, of an axle assembly having a labyrinth gap between the spindle and final drive.

FIG. 7 illustrates an axle assembly 300 with a differently configured gap between a spindle 332 and a final drive 330. More specifically, the axle assembly 300 includes a labyrinth gap 340 defining a tortuous path from a gap outlet 340a to a seal 341. In this embodiment, the virtual gap plane "Y" extends through the gap outlet 340a. While not shown in FIG. 7, the shield assembly 200 may be located above the axle assembly 300 with the shield body extending across the virtual gap plane "Y."

As used herein, the phrase "final drive assembly" is intended to encompass the combination of a ground engaging device (e.g., wheel 116), an axle assembly (e.g., rear axle assembly 119), and a shield assembly 200.

Also as used herein, the term "virtual" means having the attributes of an entity without possessing its physical form. For example, a virtual reference plane is an intangible or imaginary plane, rather than a physical one, with respect to which, e.g., location and/or orientation of other physical and/or intangible entities is defined.

INDUSTRIAL APPLICABILITY

In practice, the shield assembly 200 disclosed herein protects debris from reaching the annular gap 140 by directing such debris around the axle assembly 119. The shield assembly 200 is located above portions of both the spindle 132 and final drive 130. The shield assembly 200 includes a shield body that extends over the annular gap 140, so that debris inside the cavity 152 is directed around the axle assembly 119 under the force of gravity. The shield assembly 200 may have a peaked roof configuration, as well as a flange 220, to further ensure that debris is guided around the axle assembly 119.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A machine, comprising:
   a frame;
   a ground engaging device including a hub, the hub defining a cavity and an inboard opening to the cavity;
   an axle assembly connected to the frame and supporting the ground engaging device, the axle assembly extending along an axle axis and comprising:
   a housing coupled to the frame,
   a spindle coupled to the housing,
   a final drive rotatably coupled to the spindle and disposed within the cavity of the ground engaging device, and
   a gap disposed between the spindle and the final drive; and
   a shield assembly coupled to the axle assembly and disposed within the cavity of the ground engaging device, the shield assembly being located above portions of the spindle and the final drive, wherein the shield assembly includes a shield body extending over the gap, the shield body comprising:
   a first planar lateral portion,
   a second planar lateral portion, and
   a peaked central portion joining the first planar lateral portion to the second planar lateral portion.

2. The machine of claim 1, in which the shield body is imperforate.

3. The machine of claim 1, in which the axle assembly further includes a seal disposed in the gap.

4. The machine of claim 1, in which:
   the axle assembly includes a spindle wall coupled to and extending outward from the spindle, the spindle wall being disposed within the cavity of the ground engaging device; and
   the shield assembly is coupled to the spindle wall.

5. The machine of claim 1, in which the gap is concentric with the axle axis and disposed along a virtual gap plane extending perpendicular to the axle axis.

6. The machine of claim 5, in which the shield body further comprises:
   a shield body first end coupled to a top portion of the spindle inboard of the virtual gap plane; and
   a shield body second end disposed outboard of the virtual gap plane; and
   a shield body length extending parallel to the axle axis and across the virtual gap plane from the shield body first end to the shield body second end.

7. The machine of claim 6, in which the shield assembly further includes a flange coupled to the shield body adjacent the shield body second end.

8. A shield assembly for an axle assembly of a machine, the machine including a ground engaging device including a hub, the hub defining a cavity and an inboard opening to the cavity, the axle assembly including a spindle, a final drive rotatably coupled to the spindle, and a gap disposed between the spindle and the final drive, the shield assembly comprising:
   a shield body comprising:
   a first planar lateral portion,
   a second planar lateral portion, and
   a peaked central portion joining the first planar lateral portion to the second planar lateral portion,
   wherein the shield body is coupled to the axle assembly and disposed within the cavity of the ground engaging device,
   wherein the shield body is located above portions of the spindle and the final drive,
   wherein the shield body extends over the gap.

9. The shield assembly of claim 8, in which the shield body is imperforate.

10. The shield assembly of claim 8, in which:

the axle assembly includes a spindle wall coupled to and extending outward from the spindle, the spindle wall being disposed within the cavity of the ground engaging device; and the shield assembly is coupled to the spindle wall.

11. The shield assembly of claim 8, in which:

the gap is concentric with an axle axis and is disposed along a virtual gap plane extending perpendicular to the axle axis; and the shield body further comprises:

a shield body first end coupled to a top portion of the spindle, the shield body first end being located inboard of the virtual gap plane;

a shield body second end disposed outboard of the virtual gap plane; and a shield body length extending parallel to the axle axis and across the virtual gap plane from the shield body first end to the shield body second end.

12. The shield assembly of claim 11, further comprising a flange coupled to the shield body adjacent the shield body second end.

13. A final drive assembly for a machine, comprising:

a ground engaging device including a hub defining a cavity, and an inboard opening to the cavity;

an axle assembly, comprising:

a housing;

a spindle coupled to the housing;

a final drive rotatably coupled to the spindle and disposed within the cavity of the ground engaging device, wherein the housing, spindle, and final drive are disposed along an axle axis; and a gap disposed between the spindle and the final drive, the gap being concentric with the axle axis and disposed along a virtual gap plane extending perpendicular to the axle axis; and a shield assembly coupled to the axle assembly and disposed within the cavity of the ground engaging device, the shield assembly comprising:

a shield body located above portions of the spindle and the final drive, the shield body comprising:

a shield body first end coupled to a top portion of the spindle inboard of the virtual gap plane;

a shield body second end disposed outboard of the virtual gap plane;

a shield body length extending parallel to the axle axis and across the virtual gap plane from the shield body first end to the shield body second end;

a first planar lateral portion;

a second planar lateral portion; and a peaked central portion joining the first planar lateral portion to the second planar lateral portion.

14. The final drive assembly of claim 13, in which the shield body is imperforate.

15. The final drive assembly of claim 13, in which the axle assembly further includes a seal disposed in the gap.

16. The final drive assembly of claim 13, in which:

the axle assembly includes a spindle wall coupled to and extending outward from the spindle, the spindle wall being disposed within the cavity of the ground engaging device; and the shield assembly is coupled to the spindle wall.

17. The final drive assembly of claim 13, in which the shield assembly further includes a flange coupled to the shield body adjacent the shield body second end.

\* \* \* \* \*